US009307305B2

(12) United States Patent
Rong et al.

(10) Patent No.: US 9,307,305 B2
(45) Date of Patent: Apr. 5, 2016

(54) SMART ODN SYSTEM OF LOW POWER CONSUMPTION

(75) Inventors: Yun Rong, Hubei (CN); Dan Zhang, Hubei (CN); Xin Wang, Hubei (CN); Haicheng Chen, Hubei (CN); Fei Xiang, Hubei (CN); Fei Lei, Hubei (CN); Chao Chen, Hubei (CN); Feng Wang, Hubei (CN)

(73) Assignee: FIBERHOME TELECOMMUNICATION TECHNOLOGIES CO., LTD., Wuhan, Hubei (CN)

( * ) Notice: Subject to any disclaimer, the term of this patent is extended or adjusted under 35 U.S.C. 154(b) by 132 days.

(21) Appl. No.: 14/124,683

(22) PCT Filed: Aug. 10, 2012

(86) PCT No.: PCT/CN2012/079906
§ 371 (c)(1),
(2), (4) Date: Dec. 6, 2013

(87) PCT Pub. No.: WO2013/185414
PCT Pub. Date: Dec. 19, 2013

(65) Prior Publication Data
US 2015/0222971 A1    Aug. 6, 2015

(30) Foreign Application Priority Data

Jun. 11, 2012 (CN) .......................... 2012 1 0188970

(51) Int. Cl.
H04B 10/00    (2013.01)
H04Q 11/00    (2006.01)
H04L 12/24    (2006.01)

(52) U.S. Cl.
CPC .......... H04Q 11/0067 (2013.01); H04L 41/069 (2013.01); H04L 41/0668 (2013.01); H04Q11/0062 (2013.01); H04Q 2011/0039 (2013.01); H04Q 2011/0079 (2013.01); H04Q 2011/0081 (2013.01)

(58) Field of Classification Search
CPC .......... H04Q 11/0005; H04Q 11/0062; H04Q 11/0067
See application file for complete search history.

(56) References Cited

U.S. PATENT DOCUMENTS

| | | | |
|---|---|---|---|
| 2009/0074153 A1* | 3/2009 | Wu et al. ...................... | 379/1.04 |
| 2012/0033668 A1* | 2/2012 | Humphries ................... | 370/390 |
| 2012/0099861 A1* | 4/2012 | Zheng ............................ | 398/45 |
| 2012/0294183 A1* | 11/2012 | Fan et al. ...................... | 370/252 |

* cited by examiner

Primary Examiner — Dzung Tran
(74) Attorney, Agent, or Firm — Houtteman Law LLC

(57) ABSTRACT

The present invention discloses a smart ODN system of low power consumption, and the system is related to the ODN field and includes a smart management terminal, a master control management board, and several wiring management boards, where the smart management terminal is directly connected to the master control management board, and is also connected to the master control management board through the Internet and a mobile terminal, the master control management board is connected with several wiring management boards, each wiring management board includes a PMU and a PQU, which are independent from each other, the PQU is connected to a CPU of a wiring management board through a control line; the PMU is configured to collect and store information data of a port and communicate with the master control management board or the smart management terminal; the PQU independent from the CPU independently performs the query operation on a wiring port, and promptly obtains a port connection status. The present invention more than doubles operation time of a smart ODN management system, extends battery life of the whole system when a mobile power supply provides power for the system, shortens a time span taken by the system to respond to port changes, and improves operation efficiency of the system.

5 Claims, 3 Drawing Sheets

SMART ODN SYSTEM OF LOW POWER CONSUMPTION

BACKGROUND OF THE INVENTION

1. Field of Invention

The present invention relates to the ODN (Optical Distribution Network) field in optical communications, and in particular, to a smart ODN system of low power consumption.

2. Related Art

With the rapid development of optical communication technologies, and in particular, the widespread application of the PON (Passive Optical Network) technology in an access network, global ODN market has witnessed dramatic growth. An ODN is composed of passive optical devices, such as a single mode optical fiber, an optical splitter, and an optical connector. In an optical transmission network, an ODN performs a connection function as a backbone network; in a PON system, an ODN provides an optical transmission medium for physical connection between an OLT (Optical Line Terminal) and an ONU (Optical Network Unit).

An optical line is usually a point-to-point line in earlier days, therefore is relatively easy to manage, and generally adopts the conventional method of manual ID recording in a wiring process. Despite being simple and easy, this method is not applicable to a complex system. An ODN network of services such as FTTH (Fiber To The Home) has a point-to-multipoint line, therefore, maintenance work is substantially increased and management becomes much harder if the conventional character ID only manually recognizable is adopted for optical wiring management. In addition, a user may access at will any branch for normal signal transmission in a branched optical network without being identified by a network manager due to a point-to-multipoint line which characterizes a passive optical network in the PON technology, making an ODN much less manageable. Network data and an actual network situation may be inconsistent due to faulty manual management, thereby making follow-up network maintenance much difficult.

The smart ODN emerges as an optical distribution management technology. Based on eID, the smart ODN grants each optical fiber activity connector an ID chip with a sole code globally, manages optical distribution through electronically automatic collection to avoid a possible mistake caused by manual management, and directs network maintenance through computer network technologies, thereby highlighting a port to be operated in a complicated distribution frame adapter array, and resulting in less manual work; an electronic database records all port connection information, synchronizes the information with an actual connection situation, thereby improving efficiency due to less maintenance work.

However, a technical conundrum emerges in the practical application of the optical distribution management technology: generally speaking, devices in a whole optical distribution network are passive, thus, substantial cost is caused and some locations are not able to be supplemented with a power supply if it is required that the conventional optical distribution system is supplemented with a power supply. In this context, a mobile power supply proves to be a best choice. However, a mobile power supply small in size provides limited power supply capability and battery life while a mobile power supply large in size makes operation and maintenance inconvenient. In an optical distribution management system, to ensure smooth wiring operation, a device is required to query all wiring ports, so as to ensure that the device may promptly respond by determining whether a wiring operation is correct and notify wiring personnel. The query requires all wiring interface management boards to be provided with power for a long time in wiring operation, increasing the burden for a mobile power supply and shortening battery life for the system.

SUMMARY

The present invention aims to overcome disadvantages in the background art, and provides a smart ODN system of low power consumption, thereby more than doubling operation time of a smart ODN management system, extending battery life of the whole system when a mobile power supply provides power for the system, shortening a time span taken by the system to respond to port changes, and improving operation efficiency of the system.

The smart ODN system of low power consumption provided by the present invention includes a smart management terminal, a master control management board, and several wiring management boards, where the smart management terminal is directly connected to the master control management board, and is also connected to the master control management board through the Internet and a mobile terminal, the master control management board is connected with several wiring management boards, each wiring management board includes a PMU (Port Management Unit) and a PQU (Port Query Unit), the PMU and PQU are hardware units independent from each other, the PQU is connected to a CPU of a wiring management board through a control line and is independent from the CPU; the PMU is configured to collect and store information data of a port and communicate with the master control management board or the smart management terminal; and the PQU is configured to independently perform query operation on a wiring port and promptly obtain a port connection status.

In the foregoing technical solution, the PQU is implemented by a dedicated chip or by an FPGA through programming.

In the foregoing technical solution, the PQU always performs query operation on a port when the wiring management board operates or sleeps, activates the PMU through a control line once finding that a port connection status changes, and requests information to be sent.

In the foregoing technical solution, when no port changes when the system operates, the port management unit enters into sleep mode and only the PQU operates; when a port changes, the PQU activates the PMU, the PMU reports port change information to a management information system and enters into sleep mode again.

In the foregoing technical solution, process of initiation and operation of the system is as follows: when the system initiates, an upper level device initiates wiring management boards one by one and makes them enter into sleep mode after the operation is finished; after the upper level device finishes processing of all wiring management boards, identification and status reading of all devices are completed, then the upper level device enters into status A where the upper level device waits for an operation instruction and receives port change information; the wiring management boards except the PQU enter into sleep mode; the PQU constantly queries a port status; the PQU continues query if no change is found; the PQU activates the PMU if a change is found, the PMU promptly updates port information, contacts the upper level device, reports port change information; and the wiring management board reenters into sleep mode after the port information is reported.

In the foregoing technical solution, the process of the wiring operation is as follows: a port to be connected with an optical fiber is selected in the smart management terminal, at this moment, the smart management terminal delivers a port lighting instruction of a line to be connected, the master control management board activates a PMU where a port to be lighted is located after obtaining the instruction, delivers a port lighting instruction, receives PMU instruction acknowledge makes the PMU sleep, and reenters into status A; finally, a user starts wiring operation according to lighting information and a port status changes after the wiring operation; the user checks whether the reported change information matches with the operation, modifies the operation if the information does not match with the operation; the user ends the operation if the information matches with the operation.

In the foregoing technical solution, the process of port query is as follows: after the wiring operation, the PQU that constantly queries ports activates a corresponding PMU if finding a port status changes; the PMU obtains port change information after activated and reports an upper level device; the smart management terminal determines whether the port information change is correct and decides a next operation.

In the foregoing technical solution, the smart management terminal sends alert information if determining that the port change information is not correct; the smart management terminal starts a wiring operation of a next port if determining that the port change information is correct.

In the foregoing technical solution, the PMU reads the port change information after activated, contacts the upper level device through a communication network, and reports the port information; the upper level device determines whether to send to the upper level smart management terminal after comparing with port information recorded by the upper level device and releases a port change event.

Compared with the prior art, the present invention has the following advantages:

The present invention adds a hardware unit specializing in managing port query to a conventional wiring management board, the hardware unit always performs query operation on a port when the wiring management board operates or sleeps, power consumption of the wiring management boards in sleep mode are one third of that in operation mode, it is found after tests that operation time of a wiring management system is enough for a day's work by wiring personnel when a mobile power supply small in size is used, thereby more than doubling operation time of a smart ODN management system, extending battery life of the whole system when a mobile power supply provides power for the system, shortening a time span taken by the system to respond to port changes, improving operation efficiency of the system, and suiting an optical distribution project very much.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE INVENTION

Detailed description of the present invention is provided in the following in combination of accompanying drawings and specific embodiments.

Figure 1:
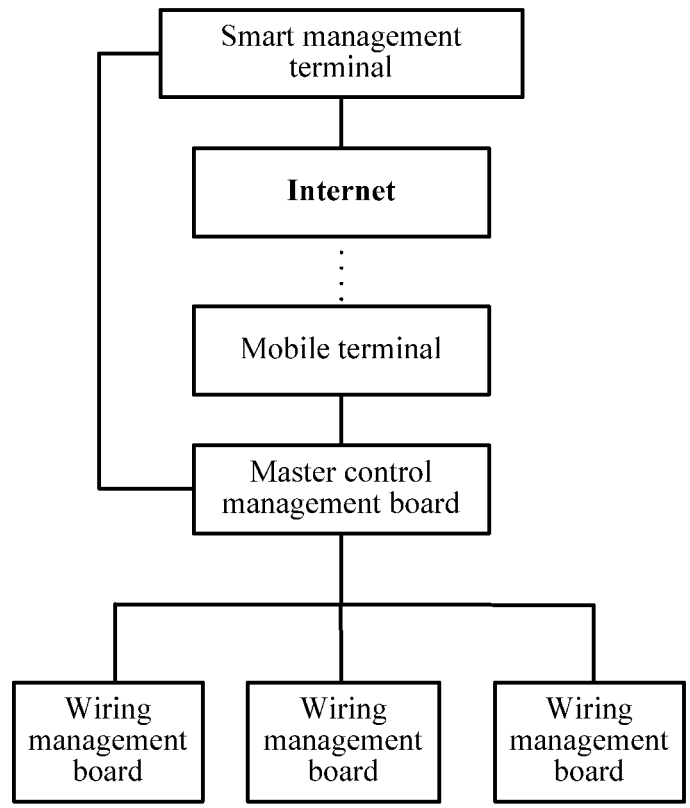
FIG. 1 is a structural block diagram of a smart ODN system according to an embodiment of the present invention.
Figure 2:
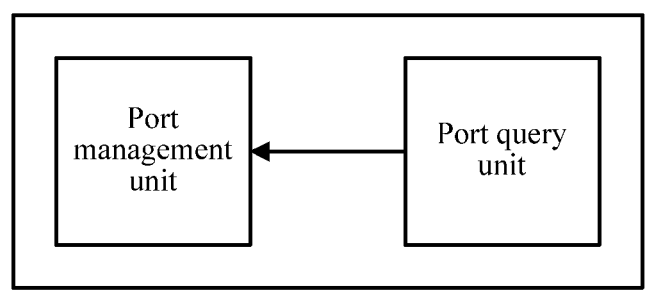
FIG. 2 is a structural block diagram of a wiring management board according to an embodiment of the present invention.

Refer to FIG. 1, a smart ODN system of low power consumption provided by an embodiment of the present invention includes a smart management terminal, a master control management board, and several wiring management boards, where the smart management terminal may be directly connected to the master control management board, and may also be connected to the master control management board through the Internet and a mobile terminal, and the master control management board is connected with several wiring management boards. Refer to FIG. 2, a wiring management board includes a PMU (Port Management Unit, port management unit) and a PQU (Port Query Unit, port query unit), which are independent from each other, the PQU is connected to a CPU of a wiring management board through a control line, is independent from the CPU; is a hardware unit that independently queries a port, and independently performs query function on a wiring port; the PQU may be a dedicated chip or a Field-Programmable Gate Array (FPGA) implemented through programming.

The PMU is responsible for collecting and storing information data of a port and communicating with the master control management board or the smart management terminal; and the PQU is responsible for promptly obtaining a port connection status, the PQU always performs query operation on a port when the wiring management board operates or sleeps, activates the PMU through a control line once finding that a port connection status changes, and requests information to be sent, when no port changes when the system operates, the port management unit enters into sleep mode and only the PQU operates. Power consumption in sleep mode is much lower than that when a wiring management board performs normal operation. The PQU activates the PMU when a port status changes; the PMU reports the port change information to a management information system, and reenters into sleep mode. During the wiring operation, only ports related to the operation change, leading to a few number of ports, therefore only a wiring management unit needed is activated for involvement in system operation, resulting in a substantial decrease in power consumption for the system, quick response to a port change, smooth wiring operation, and applicable to both RFID (Radio Frequency Identification, radio frequency identification) and eID (electronic ID) as two optical distribution identification technologies of a wiring management board.

Flow of initiation and operation of the system is as follows: when a device initiates, an upper level device initiates wiring management boards one by one and makes them enter into sleep mode after the operation; after the upper level device finishes processing of all wiring management boards, identification and status reading of all devices are completed, then the upper level device enters into status A where the upper level device waits for an operation instruction and receives port change information, the wiring management boards except the PQU enter into sleep mode; the PQU constantly queries port status; the PQU continues query if no change is found; the PQU activates the PMU if a change is found, the PMU promptly updates port information, contacts the upper level device, and reports port change information; the wiring management board reenters into sleep mode after the port information is reported.

Then a user performs wiring operation, the flow of the wiring operation is the same as the existing system at large, and only adds the step of making the wiring interface management board sleep in the end.

Figure 3:
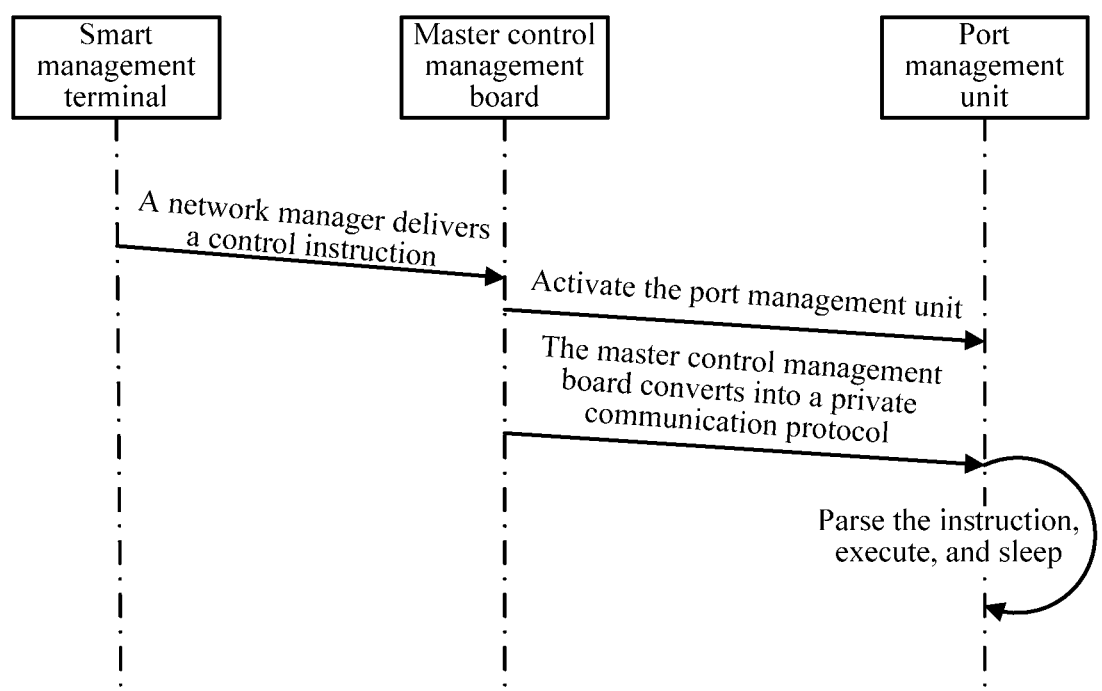
FIG. 3 is a flow chart of wiring operation according to an embodiment of the present invention.

Refer to FIG. 3, the specific process of the wiring operation is as follows: a port to be connected with an optical fiber is selected in the smart management terminal, at this moment, the smart management terminal delivers a port lighting instruction of a line to be connected, the master control management board activates a PMU where a port to be lighted is located after obtaining the instruction, delivers a port lighting instruction, receives PMU instruction acknowledge, makes the PMU sleep, and reenters into status A; finally, a user starts wiring operation according to lighting information, a port status changes after the wiring operation; the user checks whether the reported change information matches with the operation, modifies the operation if the information does not match with the operation; the user ends the operation if the information matches with the operation.

Figure 4:
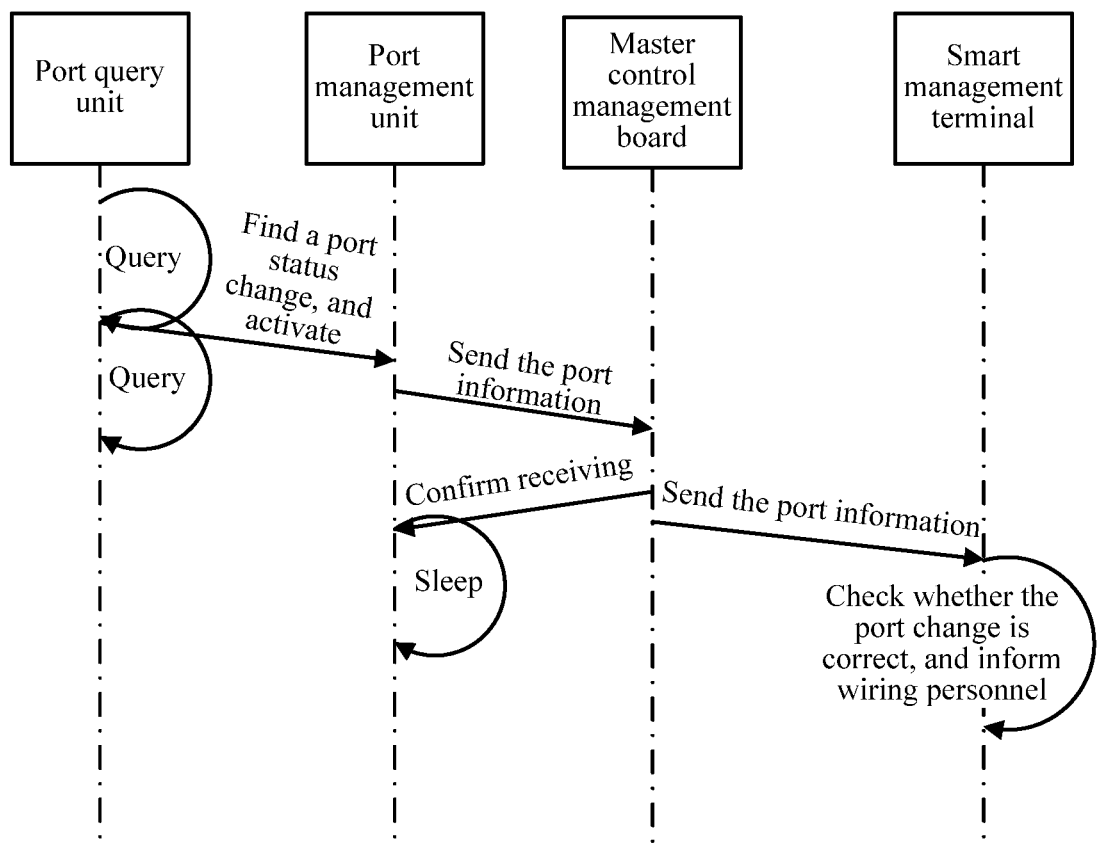
FIG. 4 is a flow chart of port query according to an embodiment of the present invention.

Refer to FIG. 4, the process of port query is as follows: after the wiring operation, the PQU that constantly queries ports activates a corresponding PMU if finding a port status changes; the PMU obtains port change information after activated and reports to the information to an upper level device; the smart management terminal determines whether the port change information is correct and decides a next operation. The smart management terminal sends alert information if determining that the port change information is not correct; the smart management terminal starts a wiring operation of a next port if determining that the port change information is correct.

The PMU in the embodiment of the present invention promptly reads the port change information after activated, contacts the upper level device through a communication network, and sends the port information; the upper level device determines whether to send to the upper level smart management terminal after comparing with port information recorded by the upper level device and releases a port change event. Now the device finishes quick automatic response to a port change. This change converts operation of constantly querying a port by a system to behavior of a hardware unit PQU of a wiring interface management board, thereby reducing power consumption, shortening a time span taken by the system to respond to a port change, and improving system operation efficiency.

Obviously a person skilled in the art may make modifications and variations without departing from the spirit and scope of the present invention, which should be construed as falling within the scope of the present invention if the modifications and variations of the present invention fall within the scope of the claims of the present invention and equivalent technologies. Contents that are not described in detail in the specification are prior art known by a person skilled in the field.

What is claimed is:

1. A smart ODN system of low power consumption, comprising:
a smart management terminal, a master control management board, and several wiring management boards, wherein the smart management terminal is directly connected to the master control management board, and is also connected to the master control management board through the Internet and a mobile terminal, the master control management board is connected with several wiring management boards, each wiring management board comprises a PMU and a PQU, the PMU and PQU are hardware units independent from each other, the PQU is connected to a CPU of a wiring management board through a control line and is independent from the CPU; the PMU is configured to collect and store information data of a port and communicate with the master control management board or the smart management terminal; and the PQU is configured to independently perform the query operation on a wiring port, and to promptly obtain a port connection status;
wherein the PQU is implemented by a dedicated chip or by an FPGA through programming;
wherein the PQU always performs query operation on a port when the wiring management board operates or sleeps, activates the PMU through a control line once finding that a port connection status changes, and requests information to be sent;
wherein when no port changes when the system operates, the wiring management unit enters into sleep mode and only the PQU operates; when a port changes, the PQU activates the PMU, the PMU reports port change information to a management information system and automatically enters into sleep mode again; and
wherein the flow of initiation and operation of the system is as follows: when the system initiates, an upper level device initiates wiring management boards one by one and makes them enter into sleep mode after the operation; after the upper level device finishes processing of all wiring management boards, identification and status reading of all devices are completed, then the upper level device enters into status A wherein the upper level device waits for an operation instruction and receives port change information; the wiring management boards except the PQU enter into sleep mode; the PQU constantly queries port status; the PQU continues query if no change is found; the PQU activates the PMU if a change is found, the PMU promptly updates port information contacts the upper level device and reports port change information; the wiring management board reenters into sleep mode after the port information is sent.

2. The smart ODN system of low power consumption according to claim 1, wherein the process of the wiring operation is as follows: a port to be connected with an optical fiber is selected in the smart management terminal, at this moment, the smart management terminal delivers a port lighting instruction of a line to be connected, the master control management board activates a PMU wherein a port to be lighted is located after obtaining the instruction, delivers a port lighting instruction, receives PMU instruction acknowledge, makes the PMU sleep, and reenters into status A; finally, a user starts wiring operation according to lighting information and a port status changes after the wiring operation; the user checks whether the sent change information matches with the operation, modifies the operation if the information does not match with the operation; the user ends the operation if the information matches with the operation.

3. The smart ODN system of low power consumption according to claim 1, wherein the process of port query is as follows: after the wiring operation, the PQU that constantly queries ports activates a corresponding PMU if finding a port status changes; the PMU obtains port change information after activated and reports the information to the upper level device; the smart management terminal determines whether the port change information is correct and decides a next operation.

4. The smart ODN system of low power consumption according to claim 3, the smart management terminal sends alert information if determining that the port change information is not correct; the smart management terminal starts a wiring operation of a next port if determining that the port change information is correct.

5. The smart ODN system of low power consumption according to claim 3, wherein the PMU reads the port change information after activated, contacts the upper level device through a communication network, and sends the port information; the upper level device determines whether to send to the upper level smart management terminal after comparing with port information recorded by the upper level device and releases a port change event.

\* \* \* \* \*